United States Patent
Whitehouse et al.

(10) Patent No.: US 10,830,203 B2
(45) Date of Patent: Nov. 10, 2020

(54) WIND TURBINE BLADE HAVING A TRAILING EDGE FLAP

(71) Applicant: Vestas Wind Systems A/S, Aarhus N. (DK)

(72) Inventors: Daniel Whitehouse, Gurnard (GB); Jagjit Bhangal, Crawley (GB)

(73) Assignee: Vestas Wind Systems A/S, Aarhus N. (DK)

( * ) Notice: Subject to any disclaimer, the term of this patent is extended or adjusted under 35 U.S.C. 154(b) by 492 days.

(21) Appl. No.: 15/517,182

(22) PCT Filed: Oct. 9, 2015

(86) PCT No.: PCT/DK2015/050306
§ 371 (c)(1),
(2) Date: Apr. 6, 2017

(87) PCT Pub. No.: WO2016/055076
PCT Pub. Date: Apr. 14, 2016

(65) Prior Publication Data
US 2017/0241400 A1    Aug. 24, 2017

(30) Foreign Application Priority Data
Oct. 10, 2014    (GB) .................................. 1417924.6

(51) Int. Cl.
*F03D 1/06* (2006.01)
*B64C 3/14* (2006.01)

(52) U.S. Cl.
CPC ...... *F03D 1/0641* (2013.01); *B64C 2003/145* (2013.01); *F05B 2230/50* (2013.01);
(Continued)

(58) Field of Classification Search
CPC ............ F03D 1/0641; F05B 2240/2211; F05B 2240/301; F05B 2250/138; F05B 2250/70;
(Continued)

(56) References Cited

U.S. PATENT DOCUMENTS

| | | | | |
|---|---|---|---|---|
| 6,030,179 A | * | 2/2000 | McCabe | F01D 5/141 416/237 |
| 2004/0131470 A1 | | 7/2004 | Boyd | |

(Continued)

FOREIGN PATENT DOCUMENTS

| | | |
|---|---|---|
| CN | 1641213 A | 7/2005 |
| CN | 100504036 C | 6/2009 |

(Continued)

OTHER PUBLICATIONS

J.A.C. Kentfield et al., The Flow Physics of Gurney Flaps, Devices for Improving Turbine Blade Performance, SED-vol. 14, Wind Energy, ASME 1993, pp. 29-35.

(Continued)

*Primary Examiner* — Philip E Stimpert
(74) *Attorney, Agent, or Firm* — Wood Herron & Evans LLP

(57) ABSTRACT

A wind turbine blade includes a trailing edge flap having a flap part protruding from the trailing edge on the pressure side of the blade. The flap part has a first section and a second section each having an upstream surface arranged to face an oncoming airflow in use. The first section extends from the trailing edge and has a proximal end and a distal end in cross-section. The proximal end is located at or near the trailing edge and the distal end is spaced apart from the trailing edge. The first section is oriented such that an obtuse angle is defined between the upstream surface of the first section and a plane that extends parallel to the local chordal (Continued)

plane and intersects the proximal end of the first section. The second section is oriented such that the upstream surfaces of the first and second sections together define a concave profile in cross section.

25 Claims, 6 Drawing Sheets

(52) U.S. Cl.
CPC . *F05B 2240/2211* (2013.01); *F05B 2240/301* (2013.01); *F05B 2250/183* (2013.01); *F05B 2250/70* (2013.01); *F05B 2280/4003* (2013.01); *F05B 2280/6003* (2013.01); *Y02E 10/72* (2013.01)

(58) Field of Classification Search
CPC ..... F05B 2280/4003; F05B 2280/6003; Y02E 10/721; B64C 2003/145; B64C 3/50; B64C 9/16; B64C 9/18; B64C 9/20; B64C 27/615; B64C 2027/7261–7294
See application file for complete search history.

(56) References Cited

U.S. PATENT DOCUMENTS

| | | | |
|---|---|---|---|
| 2012/0134817 A1 | 5/2012 | Bagepalli et al. | |
| 2012/0141269 A1* | 6/2012 | Giguere | F03D 1/0633 416/1 |
| 2012/0189455 A1* | 7/2012 | Enevoldsen | F03D 1/0641 416/223 R |
| 2012/0201690 A1 | 8/2012 | Fuglsang et al. | |

FOREIGN PATENT DOCUMENTS

| | | | |
|---|---|---|---|
| CN | 102748203 | A | 10/2012 |
| CN | 102797624 | A | 11/2012 |
| CN | 102996328 | A | 3/2013 |
| CN | 103061966 | A | 4/2013 |
| CN | 103334872 | A | 10/2013 |
| CN | 103620214 | A | 3/2014 |
| CN | 107110112 | A | 8/2017 |
| DK | 9500009 | U3 | 4/1996 |
| EP | 1112928 | A2 | 7/2001 |
| EP | 1845258 | A1 | 10/2007 |
| EP | 2514961 | A1 | 10/2012 |
| GB | 404270 | A | 1/1934 |
| WO | 0208600 | A1 | 1/2002 |
| WO | 2011042527 | A1 | 4/2011 |
| WO | 2014064195 | A1 | 5/2014 |

OTHER PUBLICATIONS

Intellectual Property Office, Search and Examination Report in GB1417924.6, dated Mar. 13, 2015.
European Patent Office, International Search Report and Written Opinion in PCT Application Serial No. PCT/DK2015/050306, dated Dec. 16, 2015.
China National Intellectual Property Administration, First Notification of Office Action in CN Application No. 201580061308.X, dated Sep. 19, 2018.
China National Intellectual Property Administration, 2nd Notification of Office Action in CN Application No. 201580061308.X, dated Aug. 6, 2019.

* cited by examiner

WIND TURBINE BLADE HAVING A TRAILING EDGE FLAP

TECHNICAL FIELD

The present invention relates generally to wind turbine blades, and more specifically to a wind turbine blade incorporating a trailing edge flap.

BACKGROUND

There is a continual desire to improve the performance of wind turbine blades to maximise the energy capture from the wind. In this respect it is known to incorporate lift-enhancing devices such as flaps along the trailing edge of the blade. In 1993, Kentfield et al demonstrated that so-called 'Gurney flaps' could successfully be applied along the trailing edge of a wind turbine blade resulting in an increase in lift without appreciably increasing the drag ('*The Flow Physics of Gurney Flaps, Devices for Improving Turbine Blade Performance*' (SED-Vol. 14, Wind Energy, ASME 1993, pages 29-35)).

Referring to FIG. 1, this is a cross-sectional view of a wind turbine blade 1 showing a local airfoil profile of the blade 1. The blade 1 comprises a simple L-shaped Gurney flap 2 mounted at the trailing edge 3 of the blade 1. The Gurney flap 2 comprises a mounting flange 4 bonded to a pressure side 5 of the blade 1 and a flap part 6 protruding from the pressure side 5. The flap part 6 is arranged perpendicular to the 'local chord' of the blade. The local chord C is the straight line extending between the leading edge 7 and the trailing edge 3 of the blade 1. The local chord defines a 'local chordal plane', which is a plane substantially perpendicular to the local airfoil profile and comprising the local chord C, i.e. a plane comprising the local chord C and perpendicular to the plane of the page in FIG. 1.

It is becoming increasingly common to incorporate Gurney flaps and other trailing edge flaps on wind turbine blades. Other examples of trailing edge flaps are described, for example, in the following patent applications: DK9500009U3 (Bonus Energy), WO 02/08600 A1 (Stichting Energieonderzoek Centrum), EP1845258A1 and EP2514961 (Siemens), and WO2011/042527 (LM Glasfiber).

Various shapes and configurations of trailing edge flaps are described in the above-referenced patent applications, and research is on-going to determine the optimum shape and configuration of these devices.

SUMMARY OF INVENTION

Against this background, the present invention provides a wind turbine blade extending in a spanwise direction between a root end and a tip end, and extending in a chordwise direction between a leading edge and a trailing edge, the blade having a pressure side and a suction side, and a trailing edge flap, the trailing edge flap comprising: a flap part protruding from the trailing edge on the pressure side of the blade, the flap part having a first section and a second section each having an upstream surface arranged to face an oncoming airflow in use; the first section extending from the trailing edge and having a proximal end and a distal end in cross-section, with the proximal end being located at or near the trailing edge and the distal end being spaced apart from the trailing edge; wherein the first section is oriented such that an obtuse angle is defined between the upstream surface of the first section and a plane that extends parallel to the local chordal plane and intersects the proximal end of the first section; and the second section is oriented such that the upstream surfaces of the first and second sections together define a concave profile in cross section.

This novel and inventive configuration of the trailing edge flap enhances the camber of the blade and advantageously reduces drag by substantially preventing the reversal of airflow in the wake downstream of the flap, i.e. the flap has a wake stabilising effect. The trailing edge flap of the present invention also exhibits greater rigidity in comparison to prior art flaps, such as the L-shaped Gurney flap shown in FIG. 1 and described above by way of background.

In a particularly advantageous configuration of the trailing edge flap, the obtuse angle between the upstream surface of the first section and the plane parallel to the local chordal plane is approximately 140 degrees.

The second section of the trailing edge flap preferably extends from the distal end of the first section. Alternatively, the second section may extend from a region of the first section that is spaced apart from the distal end of the first section.

The second section may advantageously be oriented such that an acute angle is defined between the upstream surface of the second section and a plane that extends parallel to the local chordal plane and intersects the distal end of the first section. In a particularly advantageous embodiment, this acute angle is approximately 40 degrees.

In preferred embodiments, an apex point is defined at an interface between the first and second sections. An acute angle is preferably defined between the respective upstream surfaces of the first and second sections at the apex point. In a particularly advantageous configuration, this acute angle is approximately 80 degrees.

Preferably, the first section extends from the trailing edge in a downstream direction. The second section preferably extends from the first section in a generally upstream direction. The distal end of the first section is preferably located downstream of the proximal end of the first section in use. In a particularly preferred embodiment described herein, the first and second sections together define a V-shape, and the apex of the V points in a generally downstream direction. In certain embodiments, the flap part may comprise a plurality of sections arranged in a zig-zag formation.

The second section of the trailing edge flap preferably has a proximal end and a distal end in cross-section. The proximal end may adjoin, directly or indirectly, the distal end of the first section. Preferably, the proximal end of the second section is located downstream of the distal end of the second section in use.

The trailing edge flap may further comprise a mount via which the trailing edge flap is attached to the blade. In such cases, the flap part may project from the mount. The mount provides a convenient means of attaching the trailing edge flap to the blade. The mount may advantageously be shaped to conform to the shape of the blade at the trailing edge. In a preferred embodiment, the mount is conveniently substantially L-shaped. The wind turbine blade may have a flat-back airfoil profile and the mount may substantially encapsulate a corner of the flat-back airfoil profile on the pressure side of the blade.

The trailing edge flap may be mounted to the blade by any suitable means, for example using mechanical fixings such as nuts and bolts. However, the flap is preferably mounted to the blade using an adhesive such as adhesive tape.

The trailing edge flap may be made from any suitable material, for example metal or plastic. Suitable materials include metals such as aluminium and plastics such as polyurethane. Preferably the flap is moulded from plastics material.

The trailing edge flap may be arranged along any portion of the blade, for example near the tip, near the root, along the mid span or any combination of these locations, for example the flap may be arranged along substantially the entire length of the blade. In preferred embodiments, the flap is arranged on a transition portion of the blade between the root of the blade and a maximum chord of the blade. The trailing edge flap may advantageously transition in shape near the maximum chord of the blade to a flap having a different shape, for example a flap having a substantially straight upstand.

The trailing edge flap may be substantially continuous or it may comprise a plurality of sections spaced along the trailing edge of the blade. One or more of the sections may comprise a substantially straight upstand projecting from the trailing edge. One or more of said sections is preferably formed as a plastics extrusion. In a preferred embodiment, the trailing edge flap comprises a moulded transition section near the maximum chord of the blade, which transitions in shape to a flap profile having a substantially straight upstand outboard of the maximum chord. Preferably the section(s) of the trailing edge flap outboard of the maximum chord are formed as a plastics extrusion.

The trailing edge flap may further comprise a splitter located in the wake of the flap in use. The splitter advantageously further restricts the ability of the airflow in the wake to reverse its direction, which results in reduced drag and enhanced lift. The splitter also advantageously mitigates noise. Preferably the splitter extends from the apex point between the first and second sections of the flap part.

The trailing edge flap may further comprise a panel arranged downstream of the flap part. The panel preferably forms a substantially smooth transition with the suction side of the blade. The panel serves to improve the aerodynamics of the trailing edge of the blade.

The invention also provides a wind turbine comprising a wind turbine blade as described above.

BRIEF DESCRIPTION OF THE DRAWINGS

FIG. 1 has already been described above by way of background to the present invention. In order that the present invention may be more readily understood, non-limiting examples of the invention will now be described in detail with reference to FIGS. 2 to 10, in which:

FIG. 5b is an enlarged view of part of FIG. 5a;

FIGS. 9a and 9b illustrate variants of the present invention in which a trailing edge step behind the flap is filled in.

DETAILED DESCRIPTION

Figure 2:
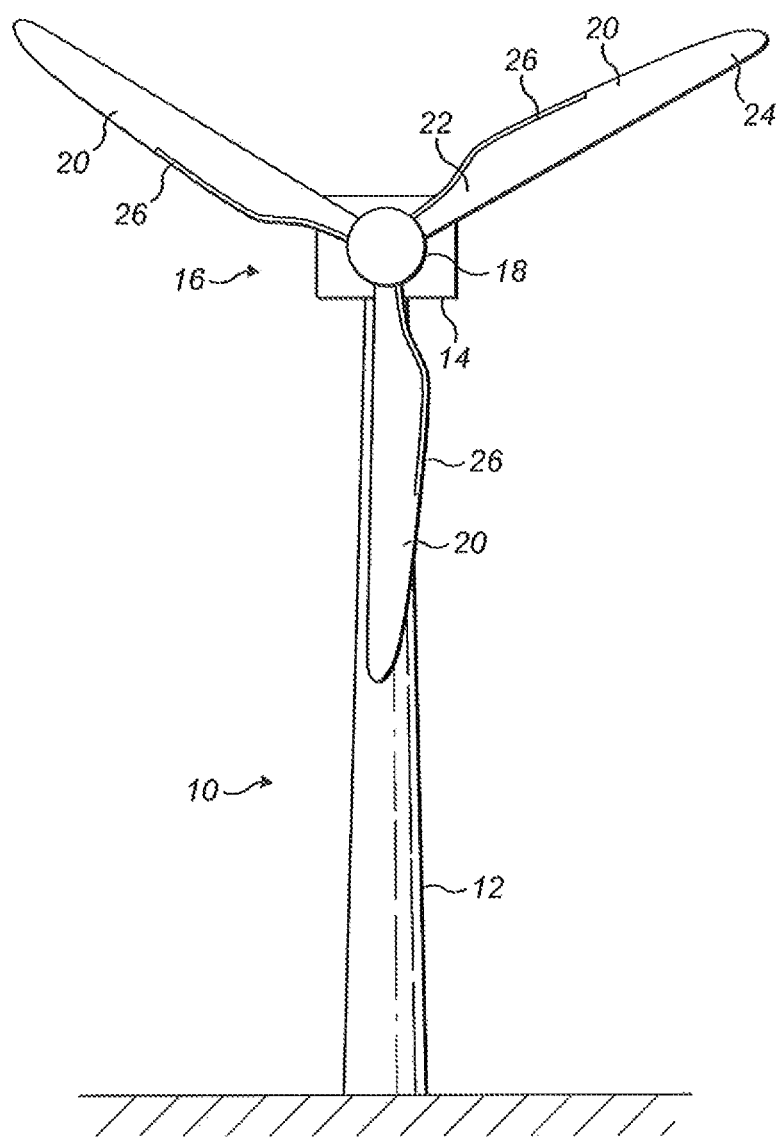
FIG. 2 is a schematic front view of a wind turbine according to an embodiment of the present invention.

Referring to FIG. 2, this shows a wind turbine 10 according to the present invention. The wind turbine 10 comprises a tower 12 supporting a nacelle 14 at an upper end of the tower 12. A rotor 16 is mounted to the nacelle 14. The rotor 16 comprises a hub 18 and three wind turbine blades 20 are mounted to the hub 18. The three blades 20 are equally spaced about the periphery of the hub 18 and extend in a longitudinal direction from a root end 22, which is mounted to the hub 18, towards a tip end 24. Each blade 20 includes a trailing edge flap 26, which will be described in further detail later.

Figure 3:
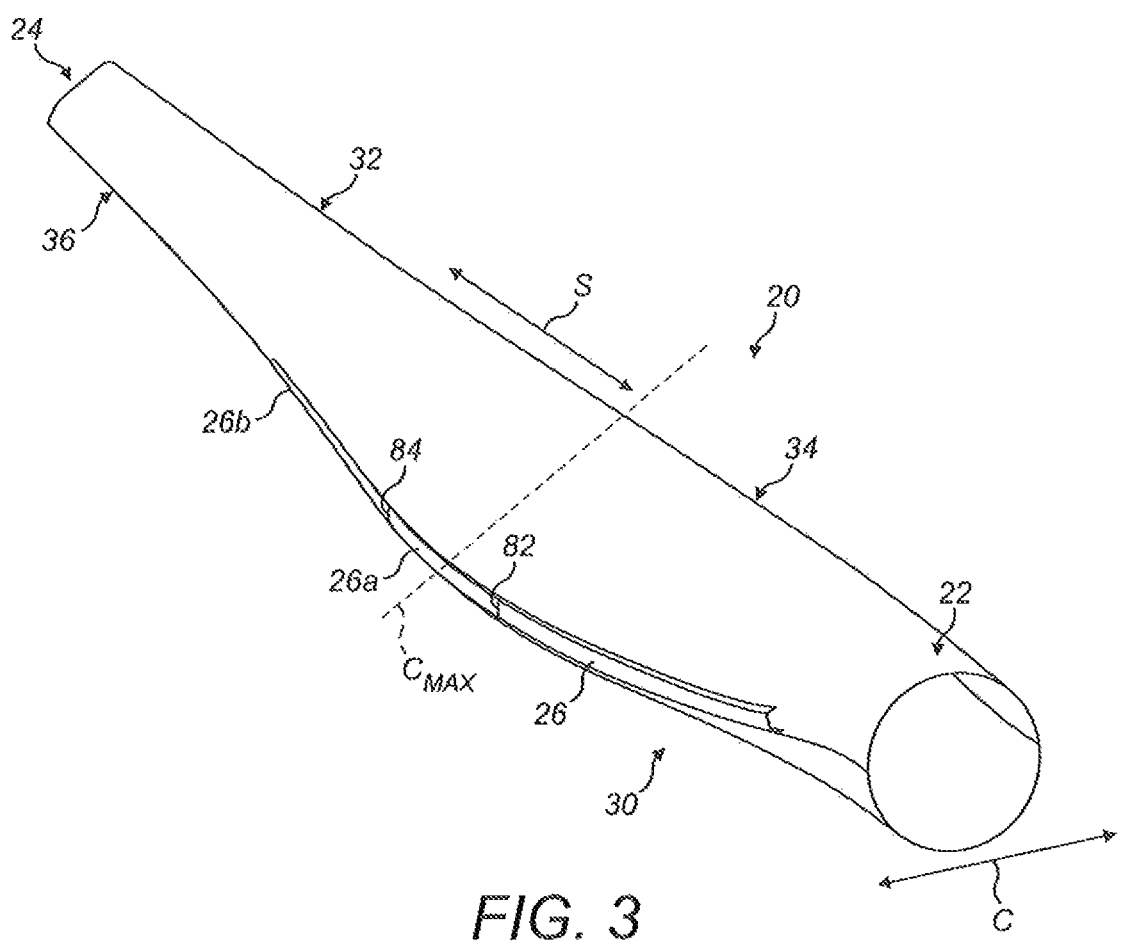
FIG. 3 is a perspective view of a wind turbine blade of the wind turbine of FIG. 2, and showing a trailing edge flap mounted along a trailing edge of the blade.

Referring to FIG. 3, this shows part of one of the wind turbine blades 20 in more detail. Here it can be seen that the root end 22 of the blade 20 is generally circular. Moving in a spanwise direction S from the root end 22 towards the tip end 24 of the blade 20 (the tip end 24 of the blade 20 is not shown in FIG. 3), it can be seen that the width (i.e. chord) of the blade 20 rapidly increases up to a maximum width (i.e. maximum chord, as indicated by the line $C_{MAX}$ in FIG. 3). The width of the blade 20 then steadily decreases moving towards the tip (not shown) of the blade 20.

The part of the blade 20 between the root end 22 of the blade 20 and the maximum chord $C_{MAX}$ is referred to herein as the 'transition portion' 30 of the blade 20. The transition portion 30 of the blade 20 has a cross-sectional profile that transitions from a circular profile at the root end 22 of the blade 20 into an aerodynamically-optimised airfoil profile at maximum chord $C_{MAX}$, as will be readily apparent to persons skilled in the art. The region of the blade 20 between the maximum chord $C_{MAX}$ and the tip of the blade 20 is referred to herein as the 'outer portion' 32 of the blade 20. This portion 32 of the blade 20 has an airfoil profile of varying geometry along its length.

The blade 20 extends in a chordwise direction C between a leading edge 34 and a trailing edge 36. The trailing edge flap 26 referred to above is mounted at the trailing edge 36. The trailing edge flap 26 extends longitudinally along the trailing edge 36, from a point close to the root end 22 of the blade 20 to a point at approximately 50% span, including along the transition portion 30 of the blade 20 inboard of the maximum chord $C_{MAX}$. In other embodiments of the invention, the trailing edge flap 26 may have a different longitudinal extent, for example the flap 26 may extend substantially along the entire spanwise length of the blade 20, i.e. from the root end 22 of the blade 20 to the tip end 24 of the blade 20. In this example, the trailing edge flap includes a plurality of sections, labelled 26, 26a and 26b; further details of these various sections will be described in detail later.

Figure 4:
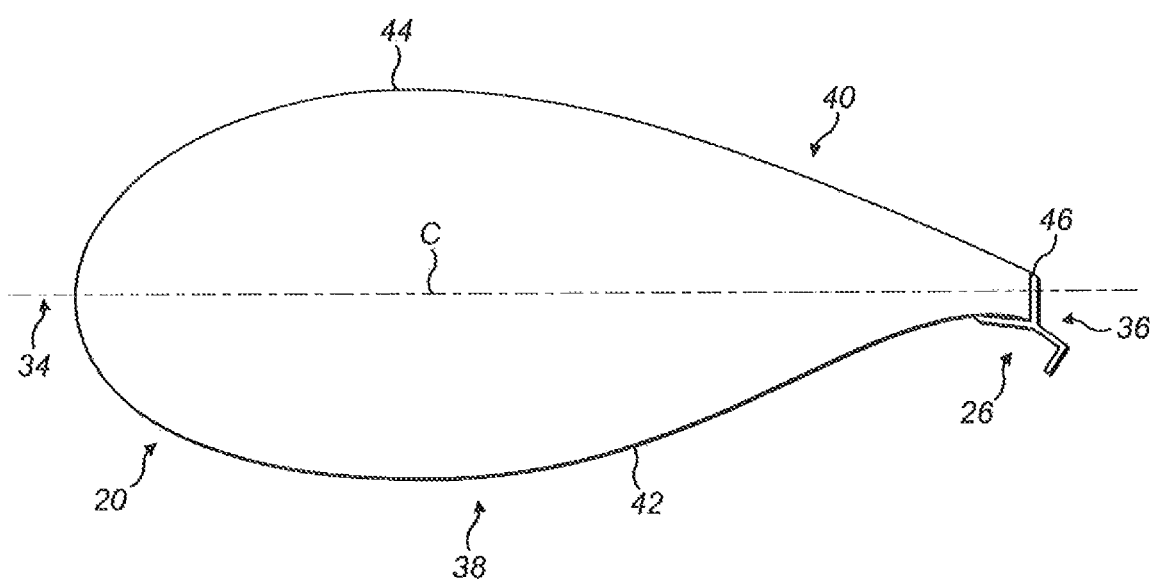
FIG. 4 is a schematic cross-sectional view of the wind turbine blade of FIG. 3.

Referring now to FIG. 4, which is a cross-sectional view through the blade 20 at maximum chord $C_{MAX}$, the blade 20 comprises a pressure side 38 and a suction side 40, which are made primarily from glass-fibre reinforced plastic (GFRP). The pressure side 38 comprises a pressure surface 42 of the blade 20, and the suction side 40 comprises a suction surface 44 of the blade 20. The pressure surface 42 and the suction surface 44 meet at the leading edge 34 of the blade 20, which has a convex-curved shape. The blade 20 in this example is a so-called 'flat-back' blade, which has a blunt trailing edge 36. Here, the pressure and suction surfaces 42, 44 are joined by a substantially flat trailing edge surface 46 of the blade 20. The trailing edge surface 46 in this section is substantially perpendicular to the chord line C of the blade 20, which is the line joining the leading and trailing edges 34, 36 of the blade 20. The trailing edge flap 26 is mounted to the trailing edge 36 as will now be described in further detail with reference to FIGS. 5a and 5b.

Figure 5A:
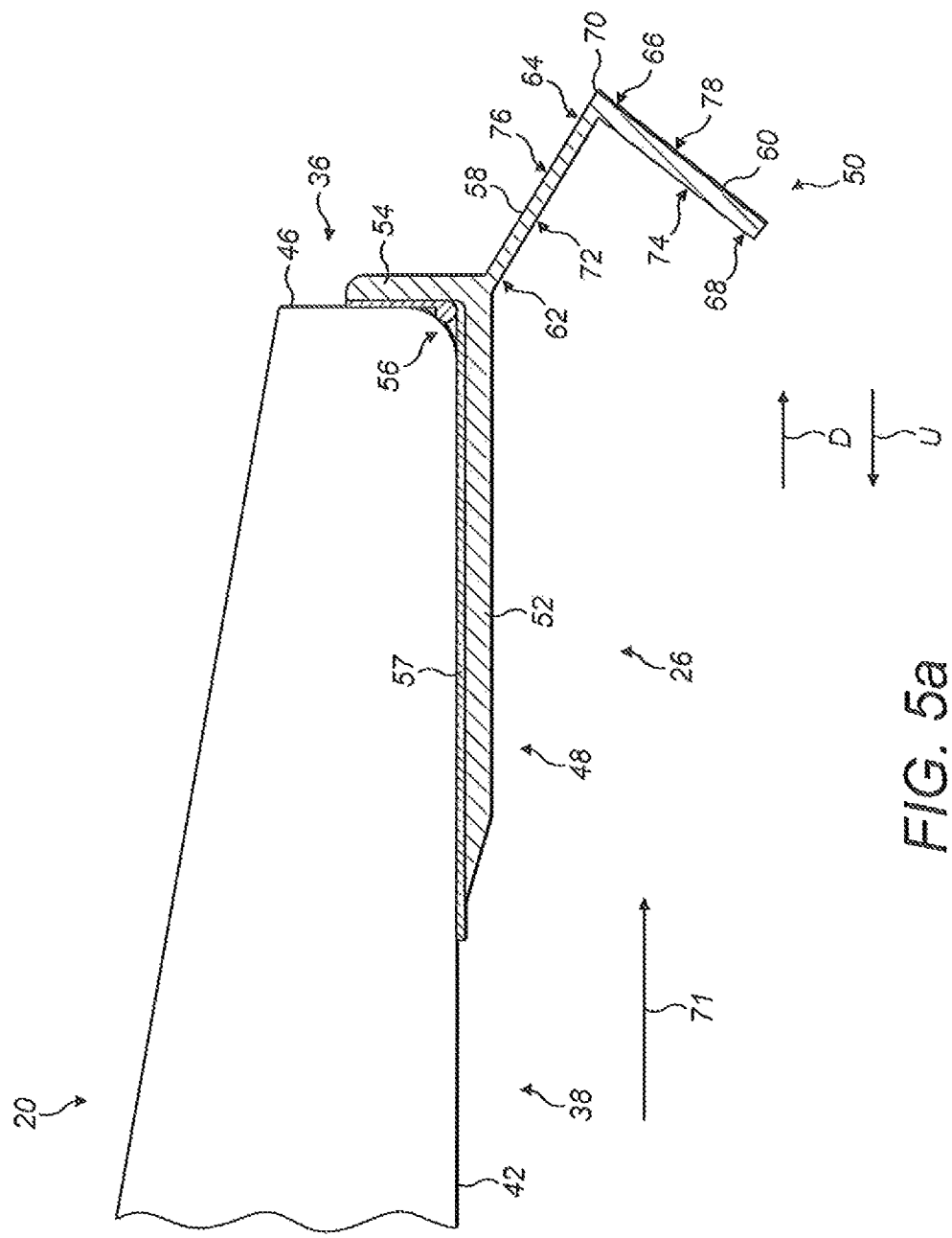
FIG. 5a is an enlarged view of part of FIG. 4, showing the trailing edge flap in more detail.

Referring to FIG. 5a, this shows a first embodiment of the trailing edge flap 26. In cross-section, the trailing edge flap 26 comprises a generally L-shaped mount 48 and a generally V-shaped flap part 50 projecting from the mount 48. The mount 48 comprises first and second mounting flanges 52, 54. The first mounting flange 52 is mounted to the pressure surface 42 of the blade 20 near the trailing edge 36. The second mounting flange 54 is arranged perpendicular to the first mounting flange 52, and is mounted to the trailing edge surface 46 that forms the flat back of the airfoil. The trailing edge surface 46 and the pressure surface 42 near the trailing edge 36 are substantially perpendicular to one another and form a corner 56, which is encapsulated by the L-shaped mount 48 of the trailing edge flap 26. The mount 48 is bonded to the blade by adhesive 57.

The substantially V-shaped flap part 50 of the trailing edge flap 26 comprises a first section 58 and a second section 60. In cross-section, the first section 58 comprises a proximal end 62 and a distal end 64. The proximal end 62 is located near the trailing edge 36 of the blade, and in this example it is integrated substantially with the corner of the L-shaped mount 48. The first section 58 extends from the trailing edge 36 of the blade 20 on the pressure side 38 of the blade 20. The first section 58 extends in a generally downstream direction D from the proximal end 62 towards the distal end 64.

Accordingly, the distal end 64 of the first section 58 is spaced apart from the trailing edge 36 and is located downstream of the proximal end 62 in use.

The second section 60 of the flap part 50 also includes a proximal end 66 and a distal end 68, in cross-section. The proximal end 66 adjoins the distal end 64 of the first section 58, and the second section 60 extends from the distal end 64 of the first section 58, in a generally upstream direction U. Accordingly, an apex point 70 is defined at an interface between the first and second sections 58, 60. In this orientation, the proximal end 66 of the second section 60 is located downstream of the distal end 64 in use.

The oncoming airflow 71 is in a left-to-right direction, i.e. it is incident near the leading edge 34 of the blade 20. The first and second sections 58, 60 of the flap part 50 each have an upstream surface 72, 74 arranged to face the oncoming airflow 71 in use, and a downstream surface 76, 78 that faces away from the oncoming airflow 71 in use. The first and second sections 58, 60 are oriented such that the upstream surfaces 72, 74 of the respective sections 58, 60 together define a concave profile in cross section. The upstream surfaces 72, 74 of the first and second sections 58, 60 generally face towards the leading edge 34 of the blade 20. Accordingly, the concave profile is open towards the leading edge 34 of the blade 20.

Figure 5B:
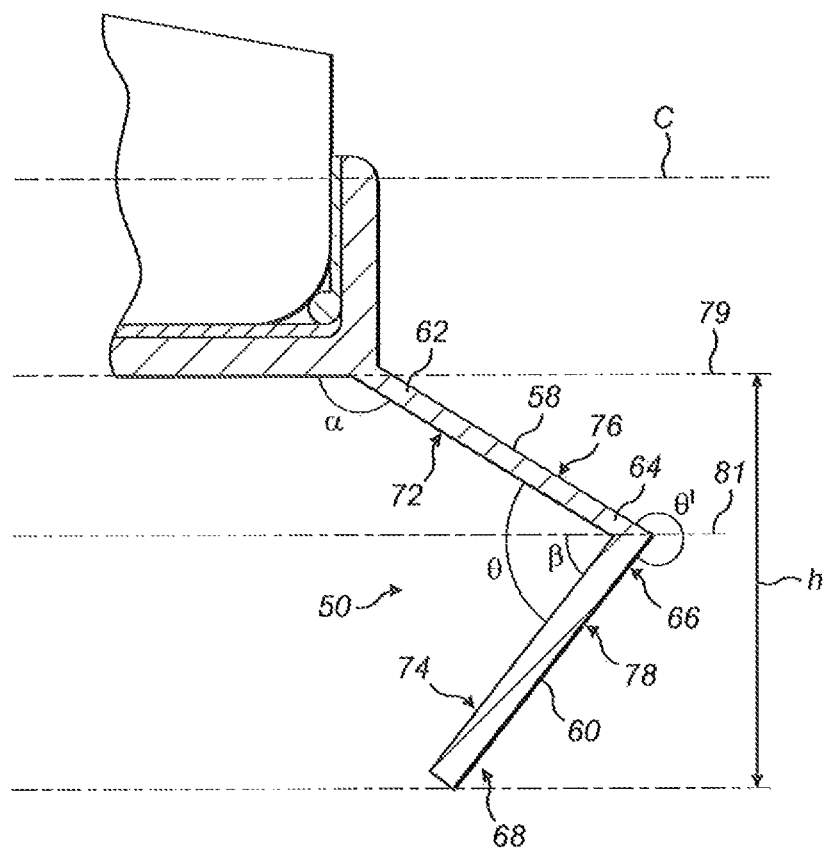

Referring to FIG. 5b, the first section 58 of the flap part 50 is oriented such that an obtuse angle α is defined between the upstream surface 72 of the first section 58 and a first plane 79, which extends parallel to the local chordal plane (i.e. the plane perpendicular to the plane of the page in FIG. 5b and comprising the local chord C) and intersects the proximal end 62 of the first section 58. The second section 60 is oriented such that an acute angle β is defined between the upstream surface 74 of the second section 60 and a second plane 81, which extends parallel to the local chordal plane and intersects the distal end 64 of the first section 58. Accordingly, an acute angle θ is defined between the respective upstream surfaces 72, 74 of the first and second sections 58, 60, and a reflex angle θ' is defined between the respective downstream surfaces 76, 78. In this example, α is approximately 140 degrees and β is approximately 40 degrees. Accordingly, θ is approximately 80 degrees, and θ' is approximately 280 degrees. Expressed in other terms, the first and second sections 58, 60 of the V-shaped flap part 50 are arranged such that the apex 70 of the V points in a downstream direction D. As indicated by the arrow h in FIG. 5b, the height of the flap part 50 corresponds approximately to the distance between the pressure surface 42 at the trailing edge 36 and the distal end 68 of the second section 60, measured substantially perpendicular to the local chord C.

Figure 6:
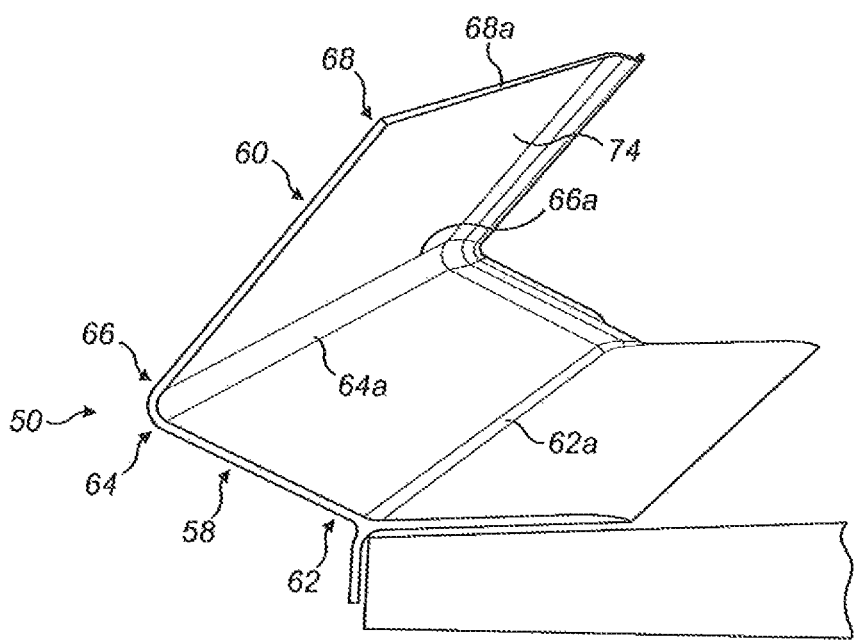
FIG. 6 is a schematic perspective view of the trailing edge flap.

Referring to the perspective view of FIG. 6, this clearly shows the respective upstream surfaces 72, 74 of the first and second sections of the flap part 50. In this example, the upstream surfaces 72, 74 are substantially flat. It is also clear from FIG. 6 that the proximal ends 62, 66 and distal ends 64, 68 of the first and second sections 58, 60 are defined, respectively, by proximal edges 62a, 66a and distal edges 64a, 68a of the first and second sections 58, 60.

The trailing edge flap 26 described above is moulded from polyurethane, which is a low-modulus material, and hence avoids bond stress concentrations and resists buckling from applied blade strains. Other suitable plastics materials include acrylonitrile styrene acrylate (ASA) and Luran® S 797 S.

Figure 1:
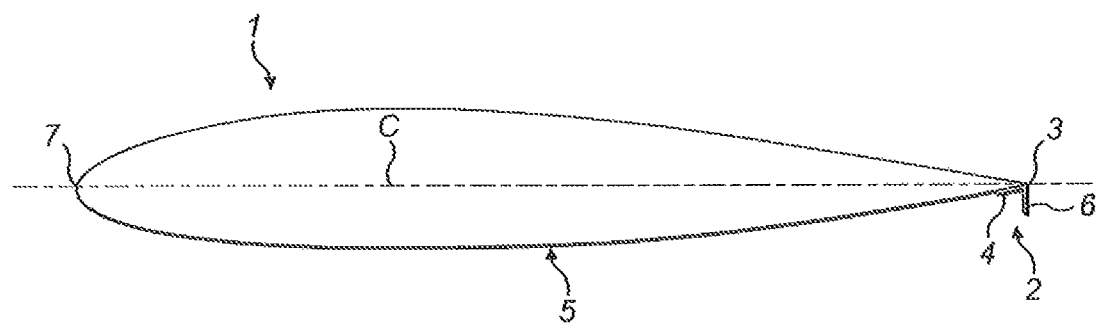

Referring again to FIG. 3, the blade 20 comprises a plurality of trailing edge flap sections 26, 26a, 26b spaced along the trailing edge 36 of the blade 20. The moulded trailing edge flap 26 described above extends along the transition portion 30 of the blade 20, from near the root 22 of the blade 20 to a spanwise location along the blade 20 just inboard of the maximum chord $C_{MAX}$. A moulded transition section 26a of the trailing edge flap is mounted at the maximum chord $C_{MAX}$. The profile of the transition section 26a varies along its length such that a first end 82 of the transition section 26a that adjoins the moulded flap section 26 has a profile corresponding to the profile shown in FIGS. 5 and 6, whilst a second end 84 of the transition section 26a has a flap profile comprising a generally straight upstand arranged substantially perpendicular to the local chordal plane, similar to the flap shown in FIG. 1. The profile of the transition section 26a smoothly transitions from one profile to the other along its length.

A third trailing edge flap section 26b is mounted to the trailing edge 36 of the blade 20 at a spanwise location outboard of the transition section 26a. This section 26b has a flap profile corresponding to the profile of the second end 84 of the transition section 26a, i.e. it has a generally straight upstand. This section 26b is a plastic extrusion. The extruded section 26b extends along the trailing edge 36 of the blade 20 up to a point near the tip of the blade 20. It will be appreciated that the extruded section 26b of the trailing edge flap has a significantly longer spanwise extent than the moulded sections 26, 26a, and being an extruded component, is less expensive to produce than the moulded sections 26, 26a. The various sections 26, 26a, 26b are connected together by suitable means such as fasteners, brackets, adhesive etc.

The trailing edge flap 26, 26a, 26b is attached to the blade 10 using double-sided adhesive tape. One or more fixings, such as nylon screws may also be used. Advantageously no metal fixings are employed, as these may attract lightning strikes or otherwise may adversely interact with lightning protections systems employed in the blades.

The trailing edge flap 26 has been described above as a moulded part. However, in another example it could also be formed from a plastic extrusion that has suitable flexibility allowing it to conform to the contours of the rotor blade on which it is mounted. In addition, the first mounting flange 52 of an extruded part may have slots cut into it to allow it to conform to the contour of the pressure surface of the blade.

Figure 7A:
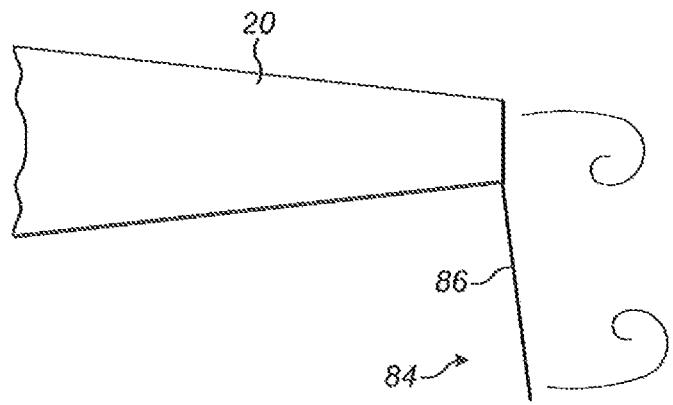
FIGS. 7a and 7b schematically illustrate how the trailing edge flap of the present invention (FIG. 7b) restricts the reversal of airflow in the wake of the flap, in comparison to prior art trailing edge flaps (FIG. 7a)
Figure 7B:
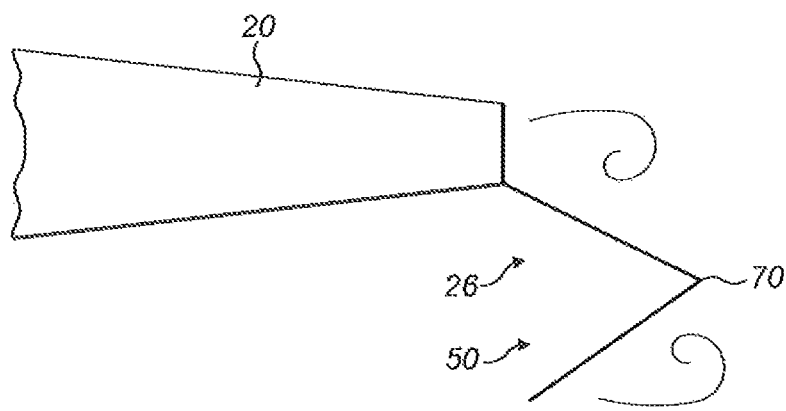

Referring now to FIGS. 7a and 7b, these show, respectively, the airflow in the wake of a prior art Gurney flap 84 (FIG. 7a) and the airflow in the wake of the trailing edge flap 26 of the present invention (FIG. 7b). Referring first to FIG. 7a, the prior art Gurney flap 84 has a straight upstand 86 and causes a reversal in the direction of airflow in its wake. This reversal of airflow has a destabilising effect and increases the drag acting on the wind turbine blade 20. In contrast, the novel shape of the flap part 50 of the trailing edge flap 26 shown in FIG. 7b reduces the ability of the airflow to reverse its direction. This is because the apex 70 of the V extends into the wake behind the blade 20. Accordingly, the flap 26 of the present invention tends to stabilise the wake, thereby reducing drag and enhancing lift in the inboard portion of the blade 20 in comparison to a flap having a straight upstand in this region.

Figure 8:
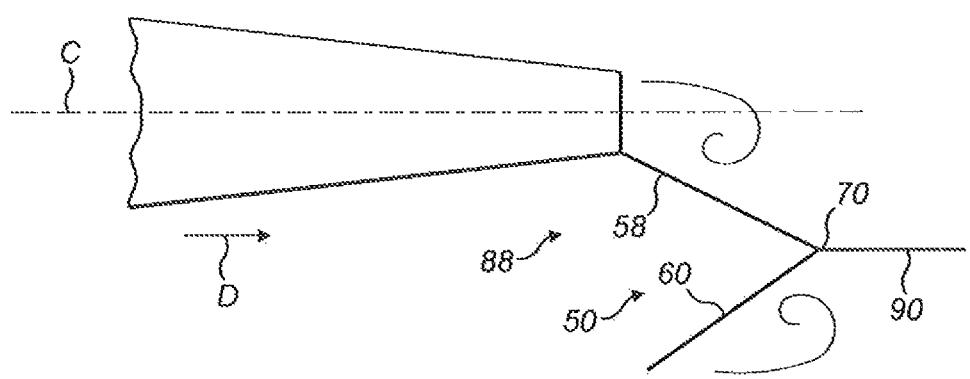
FIG. 8 is a schematic cross-sectional view of a trailing edge flap comprising a splitter in accordance with an alternative embodiment of the present invention.

Referring now to FIG. 8, this shows a second embodiment of a trailing edge flap 88 according to the present invention. This trailing edge flap 88 is substantially identical to the trailing edge flap 26 described previously, except that it additionally includes a splitter 90. The splitter 90 extends in a downstream direction D from the interface 70 between the first and second sections 58, 60 of the flap part 50, i.e. it extends from the apex 70 of V. The flap part 50 including the splitter 90 is therefore generally Y-shaped. The splitter 90 is arranged in a plane that is generally parallel to the local chordal plane C. The splitter 90 is located in the wake of the flap part 50 and acts as a physical barrier in the wake that further restricts the ability of the airflow in the wake to reverse its direction. The splitter 90 therefore further reduces drag and further enhances lift. The splitter 90 also advantageously mitigates noise.

Figure 9A:
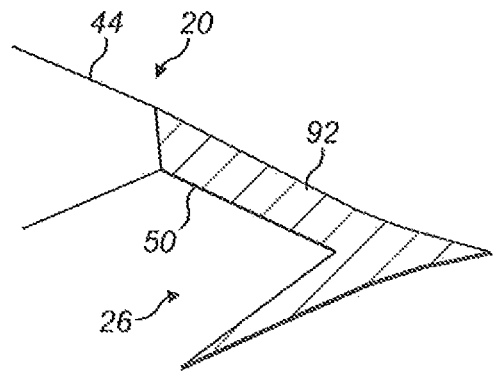
Figure 9B:
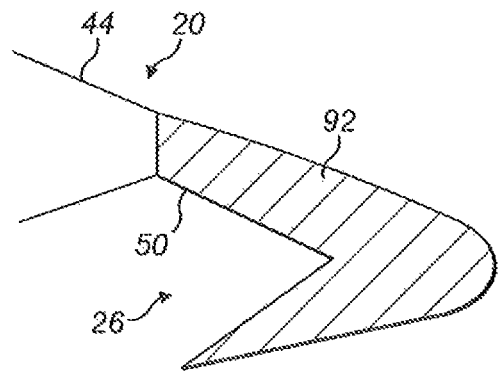

Referring now to FIGS. 9a and 9b, these show variants of the invention in which the downstream side of the trailing edge flap 26 is filled in. This is accomplished by fitting a body 92 such as a suitably-moulded panel behind the flap part 50. The panel 92 may be formed from suitable plastics materials such as polyurethane. The panel 92 advantageously provides a smooth continuation between the suction surface 44 of the blade 20 and the trailing edge flap 26 and hence results in a more streamlined trailing edge flap 26. The panel 92 may be an integral part of the trailing edge flap 26 or a separate component that is fitted to the flap 26.

Figure 10:
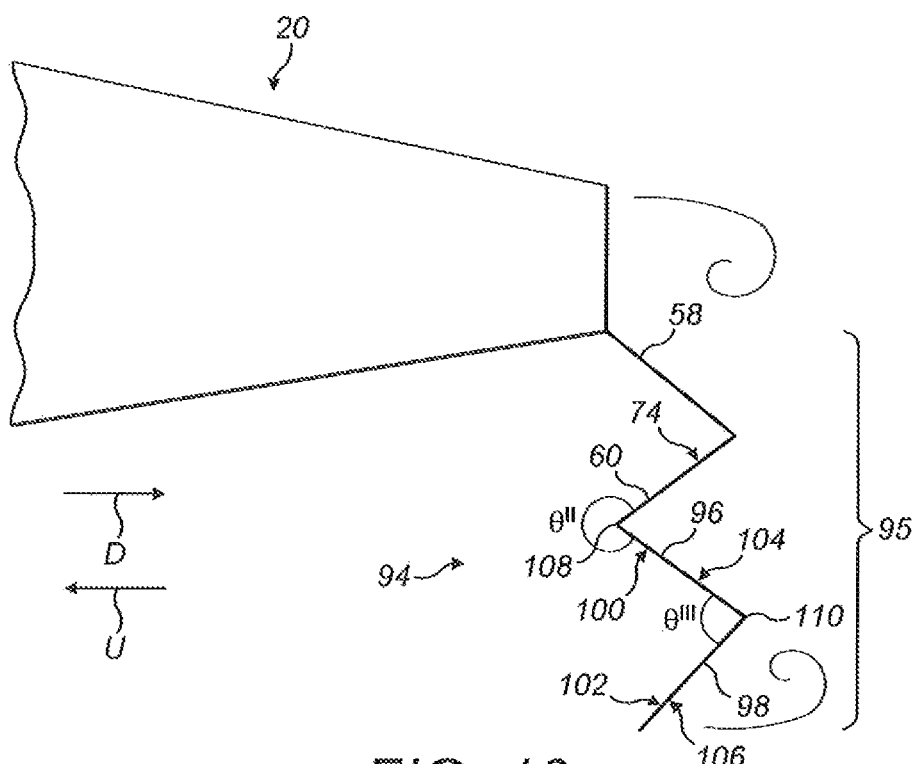
FIG. 10 is a schematic cross-sectional view of a trailing edge flap in accordance with a further embodiment of the present invention.

Referring now to FIG. 10, this shows a third embodiment of a trailing edge flap 94 according to the present invention. In this embodiment, the flap part 95 of the trailing edge flap 94 comprises third and fourth sections 96, 98 in addition to the first and second sections 58, 60 described above in relation to the first embodiment. The various sections 58, 60, 96, 98 of the flap part 95 are arranged in a zig-zag formation. Specifically, the third section 96 extends in a downstream direction D from the second section 60, and the fourth section 98 extends in an upstream direction U from the third section 96.

As with the first embodiment, the third and fourth sections 96, 98 each have an upstream surface 100, 102 and a downstream surface 104, 106. A second apex point 108 is defined between the second and third sections 60, 96, and a third apex point 110 is defined between the third and fourth sections 96, 98. A reflex angle $\theta''$ is defined between the respective upstream surfaces 74, 100 of the second and third sections 60, 96, and an acute angle $\theta'''$ is defined between the respective pressure surfaces 100, 102 of the third and fourth sections 96, 98. In this example, the reflex angle $\theta''$ is approximately 280 degrees and the acute angle $\theta'''$ is approximately 80 degrees.

The flap part 95 of this embodiment has a greater height in comparison to the height h of the flap part 50 shown in FIG. 6, and hence it further increases the camber of the blade. Airflow in the wake is advantageously stabilised according to the same principles as described in relation to FIG. 7b. Other embodiments are envisaged in which the height of the flap part is increased by having further sections arranged in a zig-zag to further increase the camber of the blade 20.

Many modifications may be made to the examples described above without departing from the scope of the present invention as defined in the following claims. For example, the sections of the flap parts may be arranged at other suitable angles in other embodiments. Whilst the flaps described above are attached to the trailing edge of the blade, in other embodiments the flaps may be integrally formed with the blade. Whilst the second section of the flap part extends directly from the first part in the above examples, in other examples the second part may extend indirectly from the first part. For example, one or more intermediate sections may be provided between the first and second sections. Whilst the trailing edge flap having the novel and inventive profile described herein is only applied to the transition portion of the blade in the above examples, other embodiments are envisaged in which the novel and inventive profile is applied along other parts of the blade. For example, the flap having the novel and inventive profile may extend substantially along the full length of the blade.

The invention claimed is:

1. A wind turbine blade extending in a spanwise direction between a root end and a tip end, and extending in a chordwise direction between a leading edge and a trailing edge, the blade having a pressure side and a suction side, and a trailing edge flap, the trailing edge flap comprising:
a flap part protruding from the trailing edge on the pressure side of the blade, the flap part having a first section and a second section each having an upstream surface arranged to face an oncoming airflow in use;
wherein the first section extends from the trailing edge and has a proximal end and a distal end in cross-section, with the proximal end being located at or near the trailing edge and the distal end being spaced apart from the trailing edge;
wherein the first section is oriented such that an obtuse angle is defined between the upstream surface of the first section and a plane that extends parallel to the local chordal plane and intersects the proximal end of the first section;
wherein the second section is oriented such that the upstream surfaces of the first and second sections together define a concave profile in cross section;
wherein the trailing edge flap further comprises a mount via which the trailing edge flap is attached to the blade, and wherein the flap part projects from the mount; and
wherein the wind turbine blade has a flat-back airfoil profile and the mount encapsulates a corner of the flat-back airfoil profile on the pressure side of the blade.

2. The wind turbine blade of claim 1, wherein the obtuse angle is 140 degrees.

3. The wind turbine blade of claim 1, wherein the second section extends from the distal end of the first section.

4. The wind turbine blade of claim 3, wherein the second section is oriented such that an acute angle is defined between the upstream surface of the second section and a plane that extends parallel to the local chordal plane and intersects the distal end of the first section.

5. The wind turbine blade of claim 4, wherein the acute angle is 40 degrees.

6. The wind turbine blade of claim 3, wherein an apex point is defined at an interface between the first and second sections.

7. The wind turbine blade of claim 6, wherein an acute angle is defined between the respective upstream surfaces of the first and second sections at the apex point.

8. The wind turbine blade of claim 7, wherein the acute angle between the respective upstream surfaces of the first and section sections at the apex point is 80 degrees.

9. The wind turbine blade of claim 3, wherein the second section extends from the first section in an upstream direction.

10. The wind turbine blade of claim 1, wherein the first section extends from the trailing edge in a downstream direction.

11. The wind turbine blade of claim 1, wherein the distal end of the first section is located downstream of the proximal end of the first section in use.

12. The wind turbine blade of claim 1, wherein the second section has a proximal end and a distal end in cross-section, the proximal end of the second section adjoining, directly or indirectly, the distal end of the first section, and the proximal end of the second section being located downstream of the distal end of the second section in use.

13. The wind turbine blade of claim 1, wherein the trailing edge flap is mounted to the blade using adhesive tape.

14. The wind turbine blade of claim 1, wherein the trailing edge flap is moulded from plastics material.

15. The wind turbine blade of claim 1, wherein the trailing edge flap is arranged on a transition portion of the blade between the root of the blade and a maximum chord of the blade.

16. The wind turbine blade of claim 15, wherein the trailing edge flap transitions in shape near the maximum chord of the blade to a flap having a straight upstand.

17. The wind turbine blade of claim 1, wherein one or more of the sections comprises a straight upstand projecting from the trailing edge.

18. The wind turbine blade of claim 17, wherein said one or more sections is a plastics extrusion.

19. The wind turbine blade of claim 1, wherein the trailing edge flap comprises a moulded transition section near the maximum chord of the blade, which transitions in shape to a flap profile having a straight upstand outboard of a maximum chord.

20. A wind turbine comprising a wind turbine blade according to claim 1.

21. The wind turbine blade of claim 1, wherein the trailing edge flap comprises a plurality of sections spaced along the trailing edge of the blade.

22. The wind turbine blade of claim 1, wherein the flap part comprises a plurality of sections arranged in a zig-zag formation.

23. The wind turbine blade of claim 1, wherein the trailing edge flap further comprises a splitter located in the wake of the flap in use.

24. The wind turbine blade of claim 23, wherein the splitter extends from the apex point between the first and second sections of the flap part.

25. A wind turbine blade extending in a spanwise direction between a root end and a tip end, and extending in a chordwise direction between a leading edge and a trailing edge, the blade having a pressure side and a suction side, and a trailing edge flap, the trailing edge flap comprising:
- a flap part protruding from the trailing edge on the pressure side of the blade, the flap part having a first section and a second section each having an upstream surface arranged to face an oncoming airflow in use;
- wherein the first section extends from the trailing edge and has a proximal end and a distal end in cross-section, with the proximal end being located at or near the trailing edge and the distal end being spaced apart from the trailing edge;
- wherein the first section is oriented such that an obtuse angle is defined between the upstream surface of the first section and a plane that extends parallel to the local chordal plane and intersects the proximal end of the first section;
- wherein the second section is oriented such that the upstream surfaces of the first and second sections together define a concave profile in cross section;
- wherein the trailing edge flap further comprises a mount via which the trailing edge flap is attached to the blade, and wherein the flap part projects from the mount; and
- wherein the mount is L-shaped.

* * * * *